United States Patent [19]

Tomatis

[11] Patent Number: 5,324,046
[45] Date of Patent: Jun. 28, 1994

[54] SEALING DEVICE FOR OPERATING SHAFTS IN FOOD PROCESSING MACHINES

[75] Inventor: Stefano Tomatis, Peveragno, Italy

[73] Assignee: CMT Costruzioni Meccaniche E Technologia S.p.A., Peveragno, Italy

[21] Appl. No.: 971,129

[22] Filed: Nov. 4, 1992

[51] Int. Cl.$^5$ .............................................. F16J 15/32
[52] U.S. Cl. .................................. 277/3; 277/59; 277/71; 277/152
[58] Field of Search ............ 277/3, 59, 68, 69, 71, 277/72 R, 74, 75, 79, 152, 17, 18, 19

[56] References Cited

U.S. PATENT DOCUMENTS

| | | | |
|---|---|---|---|
| 2,133,487 | 10/1938 | Spargo | 277/68 X |
| 2,493,152 | 1/1950 | Malcolm | 277/68 |
| 3,510,177 | 5/1970 | Shimula | 277/59 X |
| 3,521,890 | 7/1970 | Holmes et al. | 277/59 X |
| 3,550,970 | 12/1970 | Hjerten | 277/59 X |
| 3,825,270 | 7/1974 | Paramonoff et al. | 277/59 X |
| 3,879,042 | 4/1975 | Krainski et al. | 277/71 X |
| 3,943,717 | 3/1976 | Schexnayder | 277/59 X |
| 4,222,575 | 9/1980 | Sekiguchi et al. | |
| 4,413,829 | 11/1983 | Pietsch | 277/59 X |
| 5,207,794 | 5/1993 | Erdal | 277/59 X |

FOREIGN PATENT DOCUMENTS

| | | |
|---|---|---|
| 2643769 | 3/1978 | Fed. Rep. of Germany . |
| 3122406 | 12/1982 | Fed. Rep. of Germany . |
| 3122407 | 12/1982 | Fed. Rep. of Germany . |
| 966667 | 10/1950 | France .................. 277/59 |
| 554331 | 6/1943 | United Kingdom ............ 277/75 |
| 554333 | 6/1943 | United Kingdom ............ 277/152 |

Primary Examiner—William A. Cuchlinski, Jr.
Assistant Examiner—Scott W. Cummings
Attorney, Agent, or Firm—Guido Modiano; Albert Josif; Daniel O'Byrne

[57] ABSTRACT

The shaft (16) goes through a hole in a wall (10). A bushing (26) is attached to the wall and carries a first gasket (28) adjacent to the wall and sealing against the shaft (16) and a lip seal (32) at a distance from the first gasket so that a toroidal chamber (34) is defined between the first gasket, the web, the bushing and the shaft. An inlet passage (44), preferably bored in the body of the bushing, connects said toroidal chamber (34) with a source of pressurized water, and an outlet passage (48), also preferably bored in the body of the bushing, drains the water from the toroidal chamber (34).

6 Claims, 2 Drawing Sheets

SEALING DEVICE FOR OPERATING SHAFTS IN FOOD PROCESSING MACHINES

BACKGROUND OF THE INVENTION

This invention is concerned with a sealing device for shafts of food processing machines, such as shafts bearing augers, rotary cutters, and the like, in machines such as cheese processing machines, bread kneading machines, mincers and mixers for sausage processing, etc.

In machines of the kind listed above, shafts bearing members such as augers, cutters and the like are driven by motor means external to the processing area, and enter the processing chamber through a bore in the chamber wall, with a sealing gasket preventing the processed matter from leaking out of the chamber. Such gaskets are a critical point in the machine, because they have unusual requirements. On the one hand, it is necessary to lubricate the gasket for a good mechanical operation, but, on the other hand, it is unacceptable to use a conventional lubricant such as oil or grease in an area which is in direct contact with food. Moreover, it often happens that fluid components of the food penetrate the interface between the gasket lip and the shaft and build dregs favoring bacterial growths, which will subsequently contaminate the inside of the processing chamber. Even the cleaning to which the machine is subjected at the end of a work session will not remove such dregs, because of the very sealing action yielded by the gasket itself: therefore, for an effective and thorough cleaning, the shafts have to be removed from their journals, with waste of time and work; moreover, disassembling a shaft is a delicate mechanical operation, requiring skill in the subsequent reassembly.

In summary, gaskets of operating shafts in food processing machines are a highly critical aspect of the machine, and in practice it has been necessary heretofore to use compromises between mechanical and sanitary requirements.

SUMMARY OF THE INVENTION

The main object of the invention is therefore to provide a sealing device for operating shafts of food processing machines, which overcomes the above problems, and allows a processing to be carried out which is impeccable from a sanitary point of view, while also being optimal in mechanical operation.

Another object is to allow the processing chamber to be accurately cleaned without a need to disassemble its shafts.

The invention achieves the above and other objects and advantages, such as will appear from the following disclosure, by providing a sealing device for operating shafts in food processing machines, in which the shaft goes through a hole in a wall, characterized in that it comprises a bushing attached to the wall and carrying a first gasket adjacent to the wall and sealing against the shaft and a lip seal at a distance from the first gasket so that a toroidal chamber is defined between the first gasket, the lip seal, the bushing and the shaft, and in that a inlet passage connects said toroidal chamber with a source of pressurized water, and an outlet passage drains the water from the toroidal chamber.

BRIEF DESCRIPTION OF THE DRAWINGS

The invention will now be disclosed in more detail, with reference to a preferred embodiment, shown in the attached drawing by way of illustrative and non limiting example, and in which.

DESCRIPTION OF PREFERRED EMBODIMENTS

Figure 1:
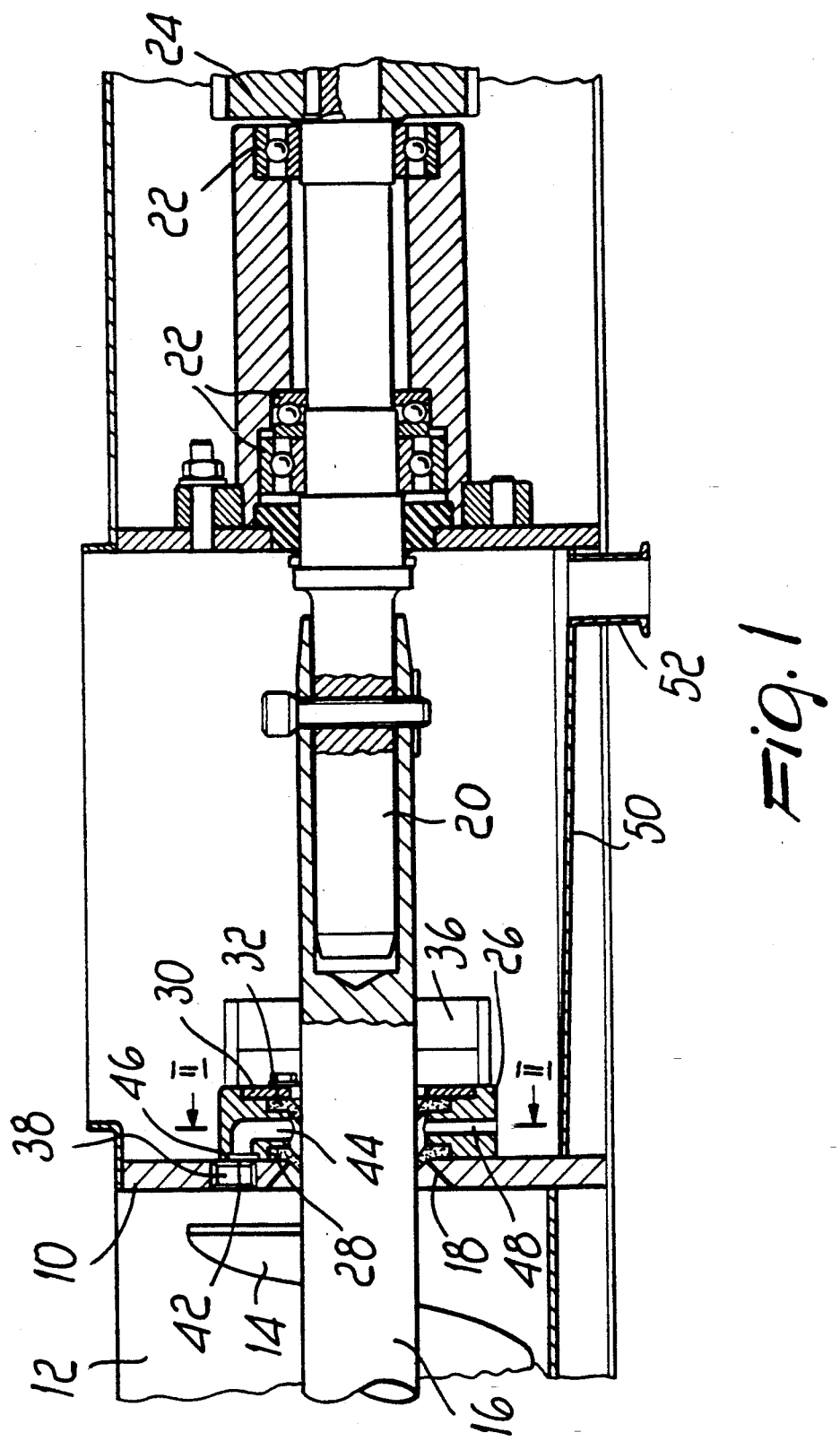
FIG. 1 is a partial view in longitudinal cross-section of a food processing machine incorporating a sealing device according to the invention.
Figure 2:
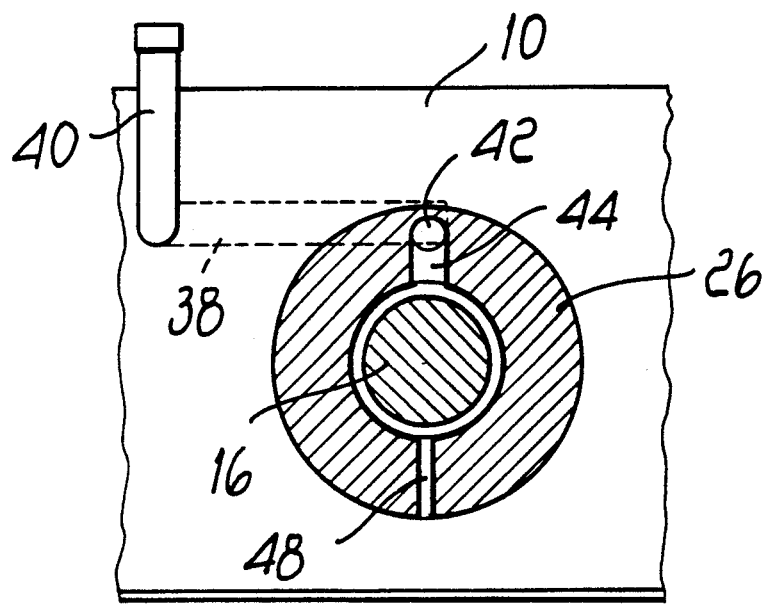
FIG. 2 is a view in transverse cross-section made along line II—II of FIG. 1.

In the Figures, reference number 10 designates a vertical wall delimiting a processing chamber 12 of a food processing machine, such as a kneading chamber in a stretching machine for pasta filata cheese. An auger 14 carried by a horizontal shaft 16 operates in chamber 12. Wall 10 has a countersunk hole 18 for entry of shaft 16. Shaft 16 is connected with another shaft 20, which is journaled in bearings 22 and is rotationally driven through a toothed wheel 24, by motor means not shown.

A bushing 26 is attached to the outside of vertical wall 10. Bushing 26 maintains a lip gasket 28, of an elastic material such as a silicone resin, having its lip slanted toward chamber 12. At an axial distance from gasket 28, another identical and similarly oriented gasket 32 is fixed to bushing 26 by means of a plate 30, so that a toroidal chamber 34 is defined between shaft 16, bushing 26 and both lip gaskets 28, 32.

In the preferred embodiment, bushing 26 is fixed against wall 10 by a pressure bracket 27, engaged by a screw not visible in the Figures, although the attachment, which does not belong to the invention, can of course be made by any other suitable means.

A conduit 38 is bored within the thickness of vertical wall 10 of the processing chamber, and communicates with a fitting 36 for supply of water of food grade from a source not shown. Conduit 34 has a port 38 opening to the outside of vertical wall 10.

In the body of the bushing a passage 44, or inlet passage, is made, opening at one end to chamber 34, at the opposite end to port 42 for communication with conduit 38, with an O-ring gasket 46 maintaining the sealing. At the bottom of bushing 26 a second passage 48, or outlet passage, is made with a cross-section substantially smaller than inlet passage 44. Beneath bushing 26 is arranged a drip pan comprising an inclined sheet 50 having a drain 52.

In the operation of the machine, when shaft 16 is rotating, water of alimentary grade is continuously supplied to fitting 40. Water fills toroidal chamber 34 and drains into passage 48, thus maintaining both gasket 28, 32 constantly lubricated. A lubrication with running water is thus provided, which avoids the contamination which would be caused by conventional lubricants such as oil or grease, would any traces of water which might ooze into the processing chamber and disperse in the food are not harmful.

At the same time, should any food material leak across the gasket from the processing chamber, due to a fault of the inside gasket or to other reasons, such leaks would not cause dregs, because they would be continuously washed away by the running water.

Preferably, the running water in the bushing is hot, e.g. at 60° to 80° C., so that the washing action is accompanied by an effect of at least partial sterilization (as known, the most common pathogenic bacteria, such as *Escherichia coli*, die already at the above-stated temperatures).

At the end of a work session, before cleaning and sterilizing the processing chamber, the pressure of the water supplied to fitting 36 is substantially increased, to a degree such that the counter-pressure generated by the outlet passage 46, which is smaller than the inlet passage, overcomes the resistance of the lip of gasket 28, thus spreading the lip all around the shaft and subjecting to a vigorous scrubbing the normally hidden side of the lip.

A preferred embodiment of a sealing device according to the invention has been shown and described, but obviously it can be modified and changed within the invention idea. For example, gaskets 28 and 32 (particularly the latter) might be of a different shape from the one shown, or a second source of high-pressure water could be provided, feeding an additional inlet passage for final cleaning. Further, one of passages 44 and 48, preferably outlet passage 48, rather than being bored in the body of the bushing, could be provided by another means, e.g. by replacing gasket 32 with a web surrounding shaft 16, with an annular port remaining around the shaft.

I claim:

1. A sealing device for operating shafts in food processing machines having a wall (10) with an openings (18) for passage of an operating shaft (16), comprising:
   a bushing (26) attached to the wall, having an inside surface coaxial with the shaft at a radial distance from the shaft, and having an inlet passage opening to the inside surface for feeding pressurized water at one of two pressure levels of a lower and a higher value, and an outlet passage leading from the inside surface to drain, and of a gage substantially smaller than said inlet passage,
   a first lip seal (32) carried by the bushing in sealing cooperating with the shaft at an edge of said inside surface away from the wall, the lip of the seal being substantially frustoconical and tapering toward the wall,
   a second lip seal (32) carried by the bushing in sealing cooperation with the shaft at an edge of said inside surface near the wall, the lip of the second seal being substantially frustoconical and tapering toward the wall, and having a rigidity such that it deflects away from the shaft when the pressurized water flows at said higher pressure.

2. The sealing device of claim 1, wherein said inlet passage (44) is bored in the body of the bushing (26).

3. The sealing device of claim 2, wherein a conduit (38) is made within the wall (10) opening into a communication port in the side of the wall toward the bushing, and wherein said inlet passage (44) bored in the body of the bushing communicates with said communication port.

4. The sealing device of claim 3, wherein the wall (10) and the bushing have flat mating surfaces, and said inlet passage (44) comprises a portion opening in register with said communication port.

5. The sealing device of claim 1, wherein said outlet passage (48) is bored in the body of the bushing.

6. The sealing device of claim 1, wherein said outlet passage (48) is radially disposed through the body of the bushing (26).